(12) United States Patent
Lemke et al.

(10) Patent No.: US 11,993,404 B2
(45) Date of Patent: May 28, 2024

(54) SATELLITES HAVING AUTONOMOUSLY DEPLOYABLE SOLAR ARRAYS

(71) Applicant: The Boeing Company, Chicago, IL (US)

(72) Inventors: Gary E. Lemke, Torrance, CA (US); Chris J. Wasson, Torrance, CA (US); John P. Mills, Hermosa Beach, CA (US); Cecilia G. Cantu, Playa del Rey, CA (US)

(73) Assignee: The Boeing Company, Arlington, VA (US)

( * ) Notice: Subject to any disclaimer, the term of this patent is extended or adjusted under 35 U.S.C. 154(b) by 17 days.

(21) Appl. No.: 18/065,276

(22) Filed: Dec. 13, 2022

(65) Prior Publication Data

US 2023/0116317 A1     Apr. 13, 2023

Related U.S. Application Data

(63) Continuation of application No. 16/224,080, filed on Dec. 18, 2018, now Pat. No. 11,535,406.

(51) Int. Cl.
*B64G 1/44* (2006.01)
*B64G 1/24* (2006.01)
(Continued)

(52) U.S. Cl.
CPC ............ *B64G 1/443* (2013.01); *B64G 1/242* (2013.01); *B64G 1/361* (2013.01); *G01C 21/025* (2013.01); *G06F 9/30003* (2013.01); *H02S 30/20* (2014.12)

(58) Field of Classification Search
CPC ........ B64G 1/443; B64G 1/242; B64G 1/361; B64G 1/002; B64G 1/288; B64G 1/222;
(Continued)

(56) References Cited

U.S. PATENT DOCUMENTS 3,544,041 A   12/1970 Billerbeck, Jr. et al.
3,757,696 A    9/1973 Derk
(Continued)

OTHER PUBLICATIONS

United States Patent and Trademark Office, "Non-Final Office Action," issued in connection with U.S. Appl. No. 16/224,080, filed Apr. 15, 2021, 13 pages.
(Continued)

*Primary Examiner* — Medhat Badawi
*Assistant Examiner* — Vicente Rodriguez
(74) *Attorney, Agent, or Firm* — HANLEY, FLIGHT & ZIMMERMAN, LLC

(57) ABSTRACT

Satellites having autonomously deployable solar arrays are disclosed. A disclosed example satellite includes a solar array, a sensor to detect that the satellite has exited a launch vehicle, a processor to, based on the satellite exiting the launch vehicle, enable release of magnets or locks of an array, a release controller to control the release of the magnets or the locks of the array based on a release sequence to autonomously deploy the solar array, and a sequence analyzer to adapt the release sequence during execution of the release sequence, wherein adapting the release sequence includes changing an order in which the magnets or the locks of the array are released based on a degree to which the solar array is unfolded.

22 Claims, 6 Drawing Sheets

(51) Int. Cl.
  *B64G 1/36* (2006.01)
  *G01C 21/02* (2006.01)
  *G06F 9/30* (2018.01)
  *H02S 30/20* (2014.01)

(58) Field of Classification Search
  CPC ........ B64G 1/244; B64G 1/44; G01C 21/025;
    G01C 21/24; H02S 30/20; H02S 20/30;
    H02S 50/00; G06F 9/30003; Y02E 10/50
  See application file for complete search history.

(56) References Cited

U.S. PATENT DOCUMENTS

| | | | | |
|---|---|---|---|---|
| 4,347,023 | A | * | 8/1982 | Rizos .................... B64G 1/645 410/2 |
| 5,131,955 | A | | 7/1992 | Stern et al. |
| 5,412,574 | A | | 5/1995 | Bender et al. |
| 5,517,920 | A | * | 5/1996 | Hinz ...................... F42D 1/055 102/202.4 |
| 6,050,526 | A | | 4/2000 | Stribling, Jr. |
| 7,278,658 | B2 | * | 10/2007 | Boucher ................. F41H 5/007 280/741 |
| 9,250,051 | B1 | * | 2/2016 | Smith .................... F42D 1/055 |
| 2004/0113020 | A1 | | 6/2004 | Wang et al. |
| 2015/0372374 | A1 | | 12/2015 | Judd et al. |
| 2020/0189770 | A1 | | 6/2020 | Lemke et al. |

OTHER PUBLICATIONS

United States Patent and Trademark Office, "Final Office Action," issued in connection with U.S. Appl. No. 16/224,080, filed Oct. 15, 2021, 15 pages.

United States Patent and Trademark Office, "Advisory Action," issued in connection with U.S. Appl. No. 16/224,080, filed Jan. 6, 2022, 3 pages.

United States Patent and Trademark Office, "Non-Final Office Action," issued in connection with U.S. Appl. No. 16/224,080, filed Feb. 25, 2022, 17 pages.

United States Patent and Trademark Office, "Notice of Allowance and Fee(s) Due," issued in connection with U.S. Appl. No. 16/224,080, filed Aug. 25, 2022, 8 pages.

\* cited by examiner

SATELLITES HAVING AUTONOMOUSLY DEPLOYABLE SOLAR ARRAYS

RELATED APPLICATION

This patent arises from a continuation of U.S. patent application Ser. No. 16/224,080, entitled "SATELLITES HAVING AUTONOMOUSLY DEPLOYABLE SOLAR ARRAYS, which was filed on Dec. 18, 2018, and has issued as U.S. Pat. No. 11,535,406 on Dec. 27, 2022. U.S. patent application Ser. No. 16/224,080 is hereby incorporated herein by reference in its entirety.

FIELD OF THE DISCLOSURE

This disclosure relates generally to satellites and, more particularly, to satellites having autonomously deployable solar arrays.

BACKGROUND

Some spacecraft, such as satellites, employ solar arrays (e.g., solar panel arrays, foldable solar panel arrays, etc.) to convert radiant energy into electrical energy. For this energy conversion, a surface area required to power a satellite can be significant. Accordingly, to transport solar arrays of the satellite with the requisite surface area, the solar arrays are often kept in a folded and stowed configuration to minimize volumetric impacts to a corresponding launch vehicle. Further, the solar arrays are folded to protect the solar arrays and/or the satellite from relatively large forces encountered during launch. Subsequent to separation of the satellite from the launch vehicle, the solar arrays are deployed and unfolded away from their stowed configuration to power the spacecraft.

Typically, a deployment sequence of the solar arrays from the satellite is performed by ground operators with little to no on-board support or self-guided decision-making. However, a significant amount of time can elapse before the spacecraft is visible and controllable by ground control stations, thereby increasing a time for the satellite to be deployed. Moreover, this time delay can pose some difficulties for the ground operators to perform the solar array deployment sequence.

Additionally, for satellites with power negative profiles in their respective stowed configuration, ground-performed solar array deployments have to be completed within a requisite time before a satellite reaches an unfavorable state (e.g., a low power state).

SUMMARY

An example satellite includes a solar array, a sensor to detect that the satellite has exited a launch vehicle, a processor to enable ignition of squibs of a squib array based on the satellite exiting the launch vehicle, and a squib controller to control the ignition of the squibs based on a firing sequence of the squibs, where the squib controller is to vary the firing sequence to autonomously deploy the solar array.

An example method of autonomously deploying a solar array includes determining, via a sensor, that the satellite has exited a launch vehicle, upon determining that the satellite has exited the launch vehicle, igniting squibs of a squib array based on a firing sequence of the squibs, and varying, via instructions executed by a processor, the firing sequence of the squibs during execution of the firing sequence.

An example tangible machine readable medium includes instructions, which when executed, cause a processor of a satellite to at least determine that the satellite has exited a launch vehicle based on sensor data, and upon determination that the satellite has exited the launch vehicle, vary a firing sequence of squibs of a squib array during execution of the firing sequence to autonomously deploy a solar array of the satellite.

Figure 1A:
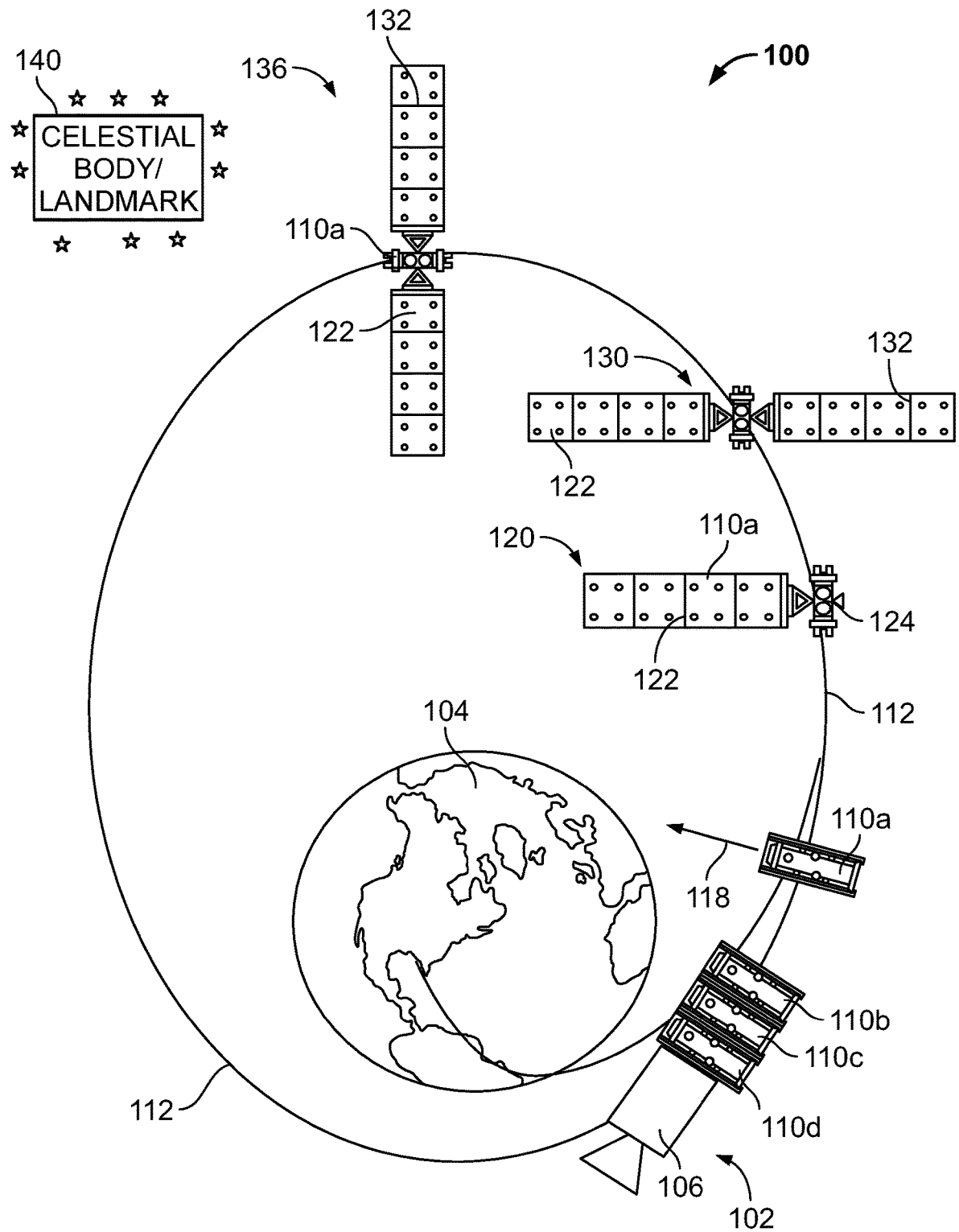
FIG. 1A is an overview of a deployment sequence in which examples disclosed herein can be implemented.

The figures are not to scale. Instead, the thickness of the layers or regions may be enlarged in the drawings. In general, the same reference numbers will be used throughout the drawing(s) and accompanying written description to refer to the same or like parts. As used in this patent, stating that any part is in any way on (e.g., positioned on, located on, disposed on, or formed on, etc.) another part, indicates that the referenced part is either in contact with the other part, or that the referenced part is above the other part with one or more intermediate part(s) located therebetween.

DETAILED DESCRIPTION

Satellites having autonomously deployable solar arrays are disclosed. Known satellites usually employ a solar array deployment that is performed by ground operators with minimal or no onboard support. However, for a satellite placed into orbit via a launch vehicle, an amount of time before the satellite is visible by ground stations can be relatively long, thereby increasing a duration time before the satellite can rely on radiant solar energy as an electrical power source. Further, communication limitations can also impair the ground operator's ability to adapt to unforeseen events or circumstances encountered during a solar array deployment process.

Examples disclosed herein enable autonomous deployment of solar panel arrays. Accordingly, ground intervention (e.g., remotely controlled deployment) is not required, thereby enabling relatively quick and accurately controlled solar array deployment. Some examples disclosed herein enable removal of components (e.g., sun sensors, micro-switch sensors, communication/control hardware and software, etc.) typically needed for ground intervention. Further, examples disclosed herein enable fault-resistant deployment of the solar arrays by implementing autonomous control that can adapt to events (e.g., failures encountered, unexpected events, malfunctions, etc.) during the deployment, thereby enabling higher reliability (e.g., a greater probability that the solar array will successfully deploy).

Examples disclosed herein utilize a squib controller to vary and/or adapt a firing sequence of squibs to enable a spacecraft (e.g., a satellite) to autonomously deploy a solar array without necessitating ground control intervention, which can be time-consuming to establish. In particular, the squibs are ignited to deploy (e.g., unfold) portions (e.g., foldable portions) of the solar array from a stowed configuration. Examples disclosed are able to adapt the firing sequence during execution of the firing sequence to ensure that the solar array is quickly and reliably self-deployed. Moreover, because ground control intervention is not needed, the spacecraft can immediately begin to deploy the solar array subsequent to separation of the spacecraft from a corresponding launch vehicle without having to wait to establish ground communications.

In some examples, the squib controller varies the firing sequence based on previously ignited squibs, squib failures and/or a next squib to be ignited. In some examples, the squib controller varies the firing sequence based on a detected folding condition (e.g., a folding status, a degree of folding, a degree to which portions are folded, etc.) of the solar array. In some examples, the solar array is deployed after the spacecraft has been oriented or adjusted to an attitude based on a detected star pattern or star tracking.

As used herein, the terms "autonomous" and "autonomously" refer to a process and/or control system implemented without the need for ground control intervention in the context of satellite/orbiting systems/spacecraft, for example. As used herein, the term "squib" refers to a pyrotechnic device that is electronically ignited to detonate an explosive charge that is used to sever a mechanical link, such as a link to retain a portion of a satellite array in a folded or stowed condition, or to attach a portion of a satellite to a launch vehicle. In this manner, a squib may be used to move and/or free an object. As used herein, the term "firing sequence" refers to a sequential order of squibs and/or pyrotechnic devices to be ignited or fired. Accordingly, the term "firing sequence" can refer to an array that can be adapted, re-sequenced, populated, de-populated, truncated, lengthened and/or modified. As used herein, the term "landmark" refers to any known reference object (e.g., a known celestial body, a known structure, a planet, the sun, etc.) that is used as a navigation and/or orientation guide. As used herein, the term "dynamic state" refers to a dynamic condition of an object that can be represented by rotational or translational momentum, acceleration and/or velocity.

FIG. 1A is an overview of a deployment sequence 100 in which examples disclosed herein can be implemented. According to the illustrated example of FIG. 1A, a launch vehicle 102 is shown reaching an orbit surrounding a planet 104. The example launch vehicle 102 includes a booster portion 106 holding deployable satellites 110 (hereinafter 110a, 110b, 110c, 110d). In this example, the satellite 110a is shown separating from the launch vehicle 102 and, subsequently, following an orbital path 112.

In operation, subsequent to the satellite 110a moving out of the launch vehicle 102 and into the orbital path 112, the satellite 110a rotates about an axis (e.g., a body axis) 118. At a time step 120, a first solar array 122 is deployed by being unfolded from a satellite body 124. At a time step 130, a second solar array 132 is deployed in addition to the first solar array 122. Further, at a time step 136, the satellite 110a is autonomously moved to orient the first and second solar arrays 122, 132, respectively, towards the sun 142 shown in FIGS. 1B and 1C to power the satellite 110a. In particular, the example satellite 110a is continuously rotated to maintain an attitude to direct the first and second solar arrays 122, 132 at respective orientations/attitudes toward the sun 142.

Figure 1B:
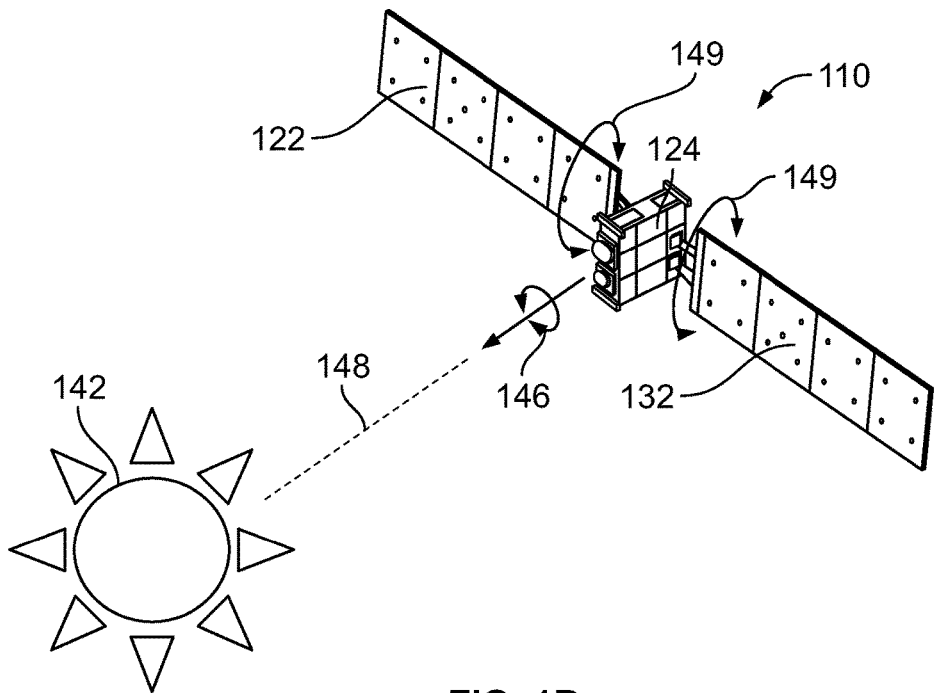
FIG. 1B depicts an example deployment of a satellite shown in FIG. 1A.

FIG. 1B depicts an example deployment of the satellite 110 shown in FIG. 1A. In this example, the satellite 110 rotates along a direction generally indicated by an arrow 146 while facing toward the sun 142 along a direction generally indicated along a direction 148. As a result, the first and second solar arrays 122, 132 are directed towards the sun and, thus, exposure to the sun 142 is not dependent on a rotational angle of the satellite 110. In some examples, the solar arrays 122, 132 can rotate independently from the satellite body 124, as generally indicated by arrows 149.

Figure 1C:
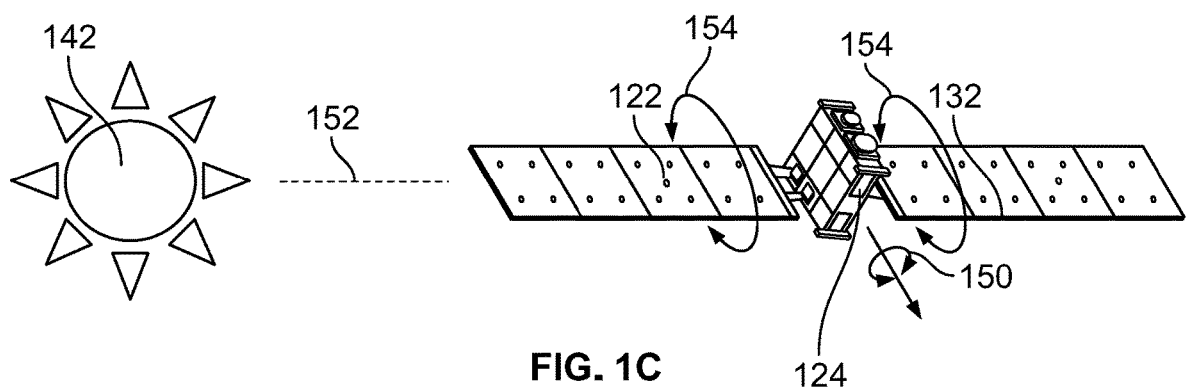
FIG. 1C depicts another example deployment of the satellite of FIGS. 1A and 1B.

FIG. 1C depicts another example deployment of the satellite 110 of FIGS. 1A and 1B. In this example, the satellite 110 rotates along a direction generally indicated by an arrow 150 while facing toward the sun 142 along a direction generally indicated by a direction 152. In contrast to the example of FIG. 1B, the satellite 110 is not oriented to face the solar arrays 122, 132 directly toward the sun 142. In some examples, the solar arrays 122, 132 can rotate independently from the satellite body 124, as generally indicated by arrows 154.

The example deployments shown in FIG. 1B and 1C illustrate rotational control of the satellite 110 and the solar arrays 122, 132. Even if the overall orientation of the satellite 110 is not controlled, which can occur nominally or in a malfunction, the satellite 110 rotation coupled with the rotation of the solar arrays 122, 132 can ensure that the deployed solar arrays 122, 132 will provide a significant amount of power to the spacecraft. In other words, the rotation of the satellite 110 (e.g., rotation provided at deployment) enables the solar arrays 122, 132 to serve their function. In contrast, if the satellite 110 was not rotating, for post solar array deployments, it may be possible for the solar arrays 122, 132 to become relatively perpendicular to the sun and, thus, not provide significant amounts of power to the satellite 110. By the satellite 110 rotating, in a less favorable situation, along the direction of the arrow 150, as shown in FIG. 1C, the satellite 110 is perpendicular to the sun 142 and the solar arrays 122, 132 would have a paddle wheel movement with respect to the sun. In a more preferable scenario in terms of power, the solar arrays 122, 132 are rotated relative to the sun 142 in a fan-like manner along the direction of the arrow 146, as shown in FIG. 1B.

Figure 2:
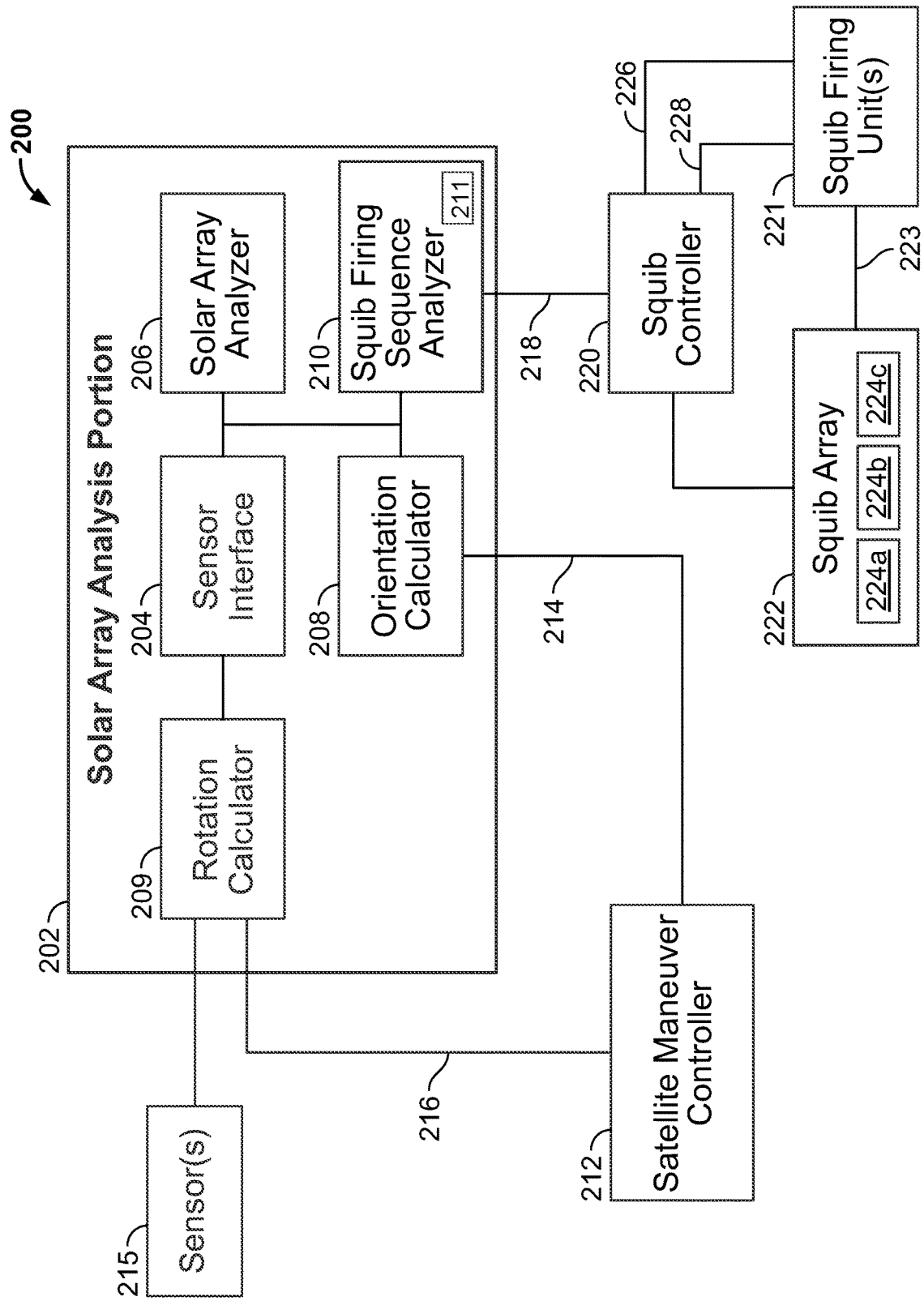
FIG. 2 is a schematic overview of an example solar array deployment controller in accordance with the teachings of this disclosure.

FIG. 2 is a schematic overview of an example solar array deployment controller 200 in accordance with the teachings of this disclosure. The example solar array deployment controller 200, which is implemented in the satellite 110 of FIG. 1, includes a solar array analysis portion 202. The example solar array analysis portion 202 includes a sensor interface 204, a solar array analyzer 206, an orientation calculator (e.g. an orientation controller) 208, a rotation calculator 209 and a squib firing sequence analyzer 210. In this example, the orientation calculator 208 is communicatively coupled to a satellite maneuver controller 212 via a communication line 214 and the sensor interface 204 is communicatively coupled to a sensor 215. Further, the sensor interface 204 is communicatively coupled to the satellite maneuver controller 212 via a communication line 216. In this example, the squib firing sequence analyzer 210 manages and/or varies a squib firing sequence (e.g., a sequential firing sequence, an ordered firing sequence, an order list, a firing array etc.) 211 and is communicatively coupled to a squib controller (e.g., a squib firing controller, a squib ignition controller) 220 via a communication line 218. In turn, the squib controller 220 is communicatively coupled to one or more squib firing units 221, as well as a squib array 222 having corresponding squibs 224 (hereinafter 224a, 224b, 224c, etc.). In this example, the squib array 222 and/or the squibs 224 are coupled to the squib firing units 221 via electrical signal lines 223. In some examples, the squib controller 220 is communicatively coupled to the squib firing units 221 via a local path 226 and a remote path 228.

To verify that the satellite 110 is in a state ready for deployment of the solar array 122 and/or the solar array 132, the sensor 215 detects whether the satellite 110 has departed from the launch vehicle 102. Additionally or alternatively, the sensor 215 is utilized by the orientation calculator 208 and/or the rotation calculator 209 to verify that the satellite 110 is in a proper attitude, rotational spin rate and/or orientation prior to deployment of the solar arrays 122, 132 away from the satellite body 124. In some such examples, the sensor 215 detects an offset of the satellite 110 from a desired attitude or rotational spin rate based on a celestial body (e.g., a celestial landmark) 140 such as a star pattern (e.g., via star tracking or mapping). In some examples, only the rotational spin rate is utilized to verify that the satellite 110 in the state ready for deployment. Additionally or alternatively, the sensor 215 detects or measures a folding condition of the solar array 122. In particular, the sensor 215 can use positional detection (e.g., via a positional sensor, micro-switches, potentiometers, gyroscopes, etc.), dynamic state or movement (e.g., spin) and/or imaging (e.g., image data obtained via an imaging sensor, such as a camera or infrared detector) to determine a degree to which the solar array 122 has folded and/or angled away from the satellite body 124. Additionally or alternatively, the sensor 215 detects a rate of movement (e.g., a rate of rotation or spin) of the satellite 110.

To deploy the solar array 122 and/or the solar array 132 outwardly from the satellite body 124, the solar array analyzer 206, the orientation calculator 208 and/or the rotation calculator 209 to verify that the satellite 110 is oriented to the proper attitude. Following verification of the attitude, dynamic state and/or rotational spin, the squib firing sequence analyzer 210 of the illustrated example directs the squib controller 220 to cause the squib firing unit 221 to fire/ignite the squibs 224 of the squib array 222 based on the firing sequence 211.

To control ignition of the squibs 224 via the squib firing unit 221 during solar array deployment, the example squib firing sequence analyzer 210 varies and/or adjusts the aforementioned firing sequence 211 as the squib controller 220 and the squib firing unit 221 execute the firing sequence 211 by directing the squib firing unit 221 to ignite designated ones of the squibs 224. In particular, the squib firing sequence analyzer 210 varies and/or adjusts (e.g., re-sequences) the firing sequence 211 to account for events (e.g., unexpected events) encountered during the execution of the firing sequence 211, thereby eliminating the need for ground control intervention. In this example, the squib firing sequence analyzer 210 varies the firing sequence 211 based on ignited ones of the squibs 224, failures of the squibs 224 and a next (e.g., next in the firing sequence) of the squibs 224 to be ignited in the firing sequence 211. However, any other appropriate parameters and/or measured conditions can be used to adjust and/or reorder the firing sequence 211. For example, the sensor 215 can be used by the solar array analyzer 206 to determine a folding condition of the solar array 122 which, in turn, can be used by the firing sequence analyzer 210 to adjust the firing sequence 211 executed by the squib firing unit 221.

In some examples, the squib firing sequence analyzer 210 varies (e.g., continuously or periodically varies) the firing sequence 211 based on an attitude or orientation of the satellite 110 (e.g., a deviation of an attitude of the satellite 110 and/or the solar arrays 122, 132 from the sun). Additionally or alternatively, the firing sequence 211 is adjusted to control firing of redundant ones of the squibs 224. In some examples, the squib firing sequence analyzer 210 utilizes momentary pauses of the squib firing unit 221 between ignition of the squibs 224. In some examples, the squibs 224 are ignited by the squib firing unit 221 to break tiedowns holding at least one of the solar arrays 122, 132. In some examples, the squibs 224 are utilized to unfold multiple folding portions (e.g., multiple folding panels) of each of the solar arrays 122, 132. In some examples, the folding condition is detected by a micro-switch, a potentiometer, an image sensor (e.g., a camera), and/or a gyroscope, etc.

While the pyrotechnic squibs 224 are described in this example, any appropriate actuation and/or movement device controlled based on a firing sequence can be implemented instead (e.g., magnets, actuated locks, etc.). While the solar arrays 122, 132 are described in this example, any appropriate array (e.g., a communication array, a sensor array, etc.) and/or component (e.g., a folding arm) can be implemented instead.

While an example manner of implementing the solar array deployment controller 200 of FIG. 2 is illustrated in FIG. 2, one or more of the elements, processes and/or devices illustrated in FIG. 2 may be combined, divided, re-arranged, omitted, eliminated and/or implemented in any other way. Further, the example sensor interface 204, the example solar array analyzer 206, the example orientation calculator 208, the example rotation calculator 209, the example squib firing sequence analyzer 210, the example satellite maneuver controller 212, the squib controller 220 and/or, more generally, the example solar array deployment controller 200 of FIG. 2 may be implemented by hardware, software, firmware and/or any combination of hardware, software and/or firmware. Thus, for example, any of the example sensor interface 204, the example solar array analyzer 206, the example orientation calculator 208, the example rotation calculator 209, the example squib firing sequence analyzer 210, the example satellite maneuver controller 212, the squib controller 220 and/or, more generally, the example solar array deployment controller 200 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example sensor interface 204, the example solar array analyzer 206, the example orientation calculator 208, the example rotation calculator 209, the example squib firing sequence analyzer 210, the example satellite maneuver controller 212, and/or the example squib controller 220 is/are hereby expressly defined to include a non-transitory computer readable storage device or storage disk such as a memory, a digital versatile disk (DVD), a compact disk (CD), a Blu-ray disk, etc. including the software and/or firmware. Further still, the example solar array deployment controller 200 of FIG. 2 may include one or more elements, processes and/or devices in addition to, or instead of, those illustrated in FIG. 2, and/or may include more than one of any or all of the illustrated elements, processes and devices.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 3:
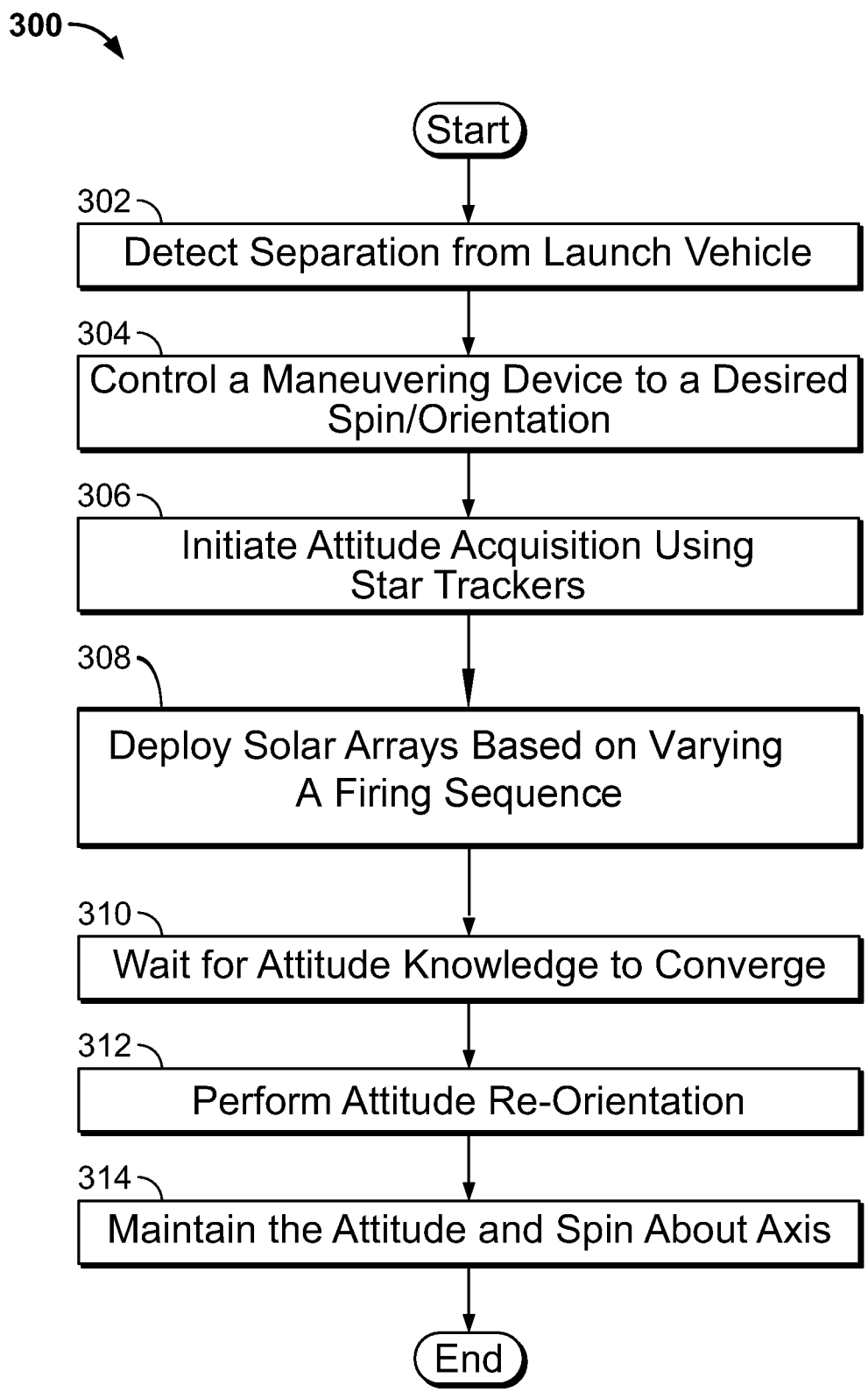
FIG. 3 is a flowchart representative of machine readable instructions which may be executed to implement the example solar array deployment controller of FIG. 2.
Figure 4:
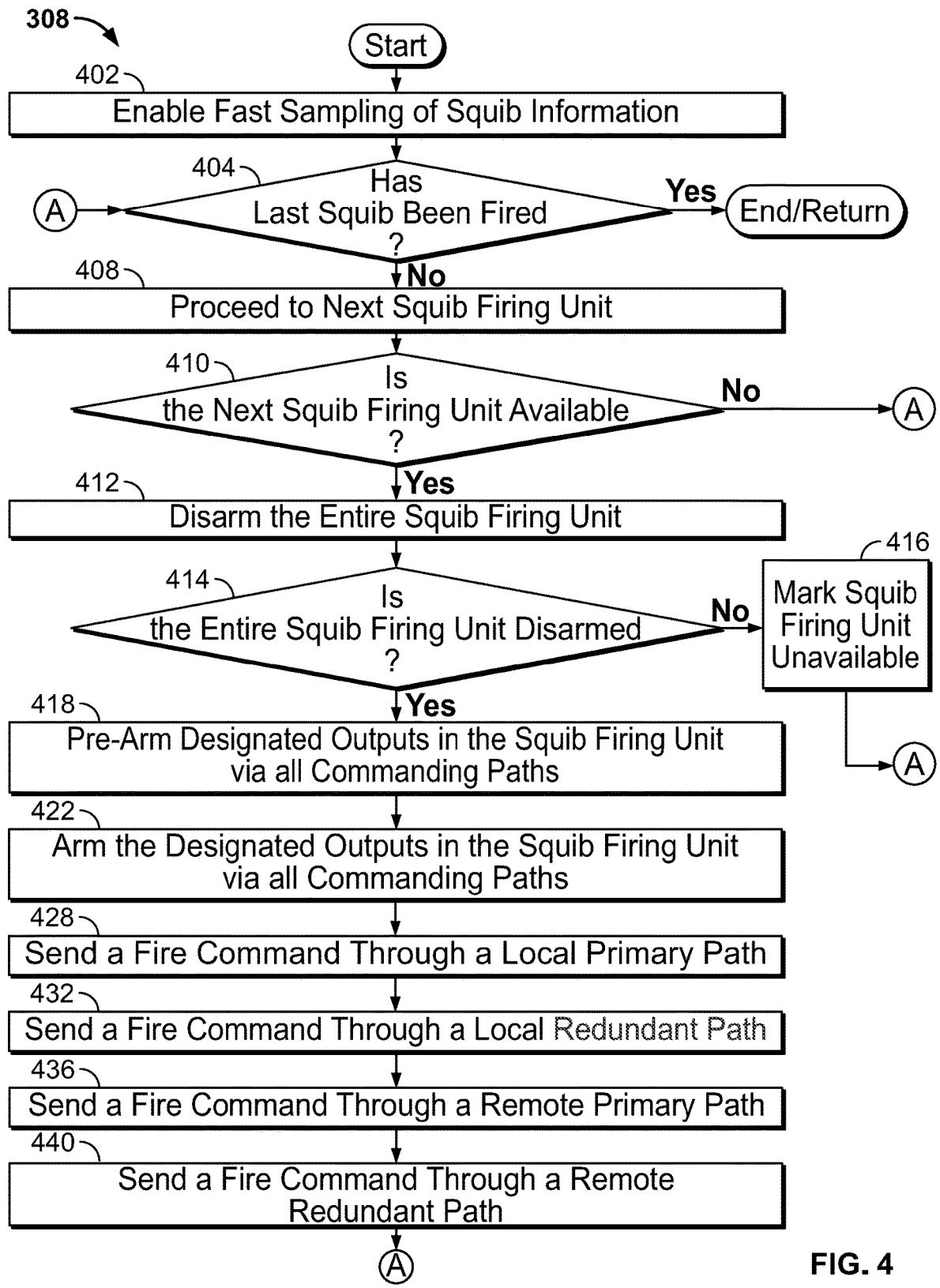
FIG. 4 is a flowchart representative of a subroutine of the machine readable instructions of FIG. 3.

Flowcharts representative of example hardware logic, machine readable instructions, hardware implemented state machines, and/or any combination thereof for implementing the solar array deployment controller 200 of FIG. 2 are shown in FIGS. 3 and 4. The machine readable instructions may be an executable program or portion of an executable program for execution by a computer processor such as the processor 512 shown in the example processor platform 500 discussed below in connection with FIG. 5. The program may be embodied in software stored on a non-transitory computer readable storage medium such as a CD-ROM, a floppy disk, a hard drive, a DVD, a Blu-ray disk, or a memory associated with the processor 512, but the entire program and/or parts thereof could alternatively be executed by a device other than the processor 512 and/or embodied in firmware or dedicated hardware. Further, although the example program is described with reference to the flowcharts illustrated in FIGS. 3 and 4, many other methods of implementing the example solar array deployment controller 200 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 3 and 4 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

The example method 300 of FIG. 3 begins as the satellite 110 has been launched proximate the orbital path 112 by the launch vehicle 102. According to the illustrated example, the satellite 110 is launched from the launch vehicle 102 while the solar arrays 122, 132 are folded against the satellite body 124 (shown in FIG. 1). In other words, the solar arrays 122, 132 are in their stowed, folded states when the satellite 110 departs or launches from the launch vehicle 102.

According to the illustrated example, the sensor 215 detects a separation of the satellite 110 from the launch vehicle 102 (block 302). In this example, the sensor 215 is part of the satellite 110 and is used to sense a marker (e.g., a visual marker, a magnetic marker, etc.) of the launch vehicle 102 to determine whether the satellite 110 is coupled and/or disposed within the launch vehicle 102. For example, the sensor 215 of the satellite 110 monitors whether the satellite 110 has separated from the launch vehicle 102. In some examples, the sensor 215 utilizes visual or proximity indicators. In some other examples, opening "three for two" redundant switches are used to indicate that the satellite 110 has separated from the launch vehicle 102.

At block 304, the rotation calculator 209 directs the satellite maneuver controller 212 to control a maneuvering device (e.g., a reaction wheel, thrusters, etc.) to a desired attitude, spin bias and/or orientation. In this example, the satellite maneuver controller 212 causes the maneuvering device to move the satellite into an attitude, spin rate, dynamic state and/or orbital path designated for solar panel deployment.

Next, an orientation or attitude is acquired by the orientation calculator 208 and/or the satellite maneuver controller 212 based on landmarks (e.g., star patterns, celestial bodies, etc.) (block 306). For example, the orientation calculator 208 and/or the satellite maneuver controller 212 can utilize star tracking (e.g., star tracking information) to direct the aforementioned maneuvering device to a desired orientation.

According to the illustrated example, the solar arrays 122, 132 are deployed based on the squib firing sequence analyzer 210 and/or the solar array analyzer 206 by varying the firing sequence 211 (block 308). As will be discussed in greater detail below in connection with FIG. 4, the solar arrays 122, 132 are autonomously deployed based on the squib controller 220 executing and varying a firing/ignition sequence 211 of the squibs 224 of the squib array 222. This deployment of the solar arrays 122, 132 based on the aforementioned squib firing sequence 211 is described in greater detail below in connection with FIG. 4. In other examples, other non-pyrotechnic deployment or movement devices are implemented instead. In some examples, the solar arrays 122, 132 are deployed concurrently/simultaneously. In other examples, the solar arrays 122, 132 are deployed at different times (e.g., subsequent to one another) and/or deployed at differing angular displacements from one another.

In some examples, at least one of the satellite maneuver controller 212, the orientation calculator 208, the rotation calculator 209, the solar array analyzer 206 and/or the squib firing sequence analyzer 210 enable a waiting period for attitude knowledge to converge prior to further action and/or movement of the satellite 110 (block 310).

According to the illustrated example, the orientation calculator 208 and/or the satellite maneuver controller 212 direct attitude re-orientation of the satellite 110 (block 312). In particular, the orientation calculator 208 and/or the satellite maneuver controller 212 cause the satellite 110 to be moved in an orientation that increases (e.g., maximizes) incident rays on the solar arrays 122, 132, for example. Additionally or alternatively, the satellite 110 is moved into an orientation in which momentum accumulation is reduced (e.g., minimized). Additionally or alternatively, the rotation calculator 209 directs the satellite maneuver controller 212 to rotate the satellite 110 to ensure a steady power state.

At block 314, the satellite 110 is maintained by the orientation calculator 208, the rotation calculator 209 and/or the satellite maneuver controller 212 to maintain an attitude and spin about an axis (e.g., a sun-safe axis, a thermal axis, etc.) that maintains a thermal condition (e.g., maintain thermal safety) of the satellite 110, for example, and the process ends.

Turning to FIG. 4, the subroutine 308 of FIG. 3 is performed by the squib firing sequence analyzer 210 and the squib controller 220 shown in FIG. 2. In particular, ignition of the squibs 224 of the squib array 222 via the squib firing unit 221 is controlled to direct movement and/or unfolding of the solar arrays 122, 132. Accordingly, varying a firing sequence of ignition (e.g., the firing sequence 211) of the squibs 224 enables deployment of the solar arrays 122, 132 to be situation-adaptable and, thus, autonomous because typical ground control intervention is not needed.

At block 402, fast sampling of squib information is enabled. For example, the squib controller 220 causes the squibs 224 to provide status information and/or firing status to the squib controller 220 and/or the squib firing sequence analyzer 210 at an increased data transfer rate.

At block 404, it is determined whether a last of the squibs 224 has been ignited (e.g. last squib has been fired). If it is determined that the last of the squibs 224 has been fired/ignited (block 404), the process ends. Otherwise, control of the process proceeds to block 408.

At block 408, the process proceeds to a next of the squib firing units 221. For example, each of the squib firing units 221 can be ordered in the squib firing sequence 211. In some examples, redundant ones of the squibs 224 are part of the squib firing sequence 211.

At block 410, it is then determined whether the next squib firing unit 221 is available. If not (block 410), control of the process returns to block 404. Otherwise, control of the process proceeds to block 412.

At block 412, the example squib controller 220 disarms the entire squib firing unit 221. For example, this disarming of the squib firing unit 221 is accomplished by returning the squib firing unit 221 to a known configuration via all of its corresponding command paths.

At block 414, it is then determined by the squib controller 220 whether the entire squib firing unit 221 is disarmed. If the entire squib firing unit 221 is not disarmed (block 414), the squib firing unit 221 is marked as a firing unit that is unavailable or unable to be ignited (block 416) and control of the process returns to block 404. Otherwise, control of the process proceeds to block 418.

At block 418, designated outputs of the squib firing unit 221 are pre-armed via all commanding paths, for example. All commanding paths includes paths 226-228 shown above in connection with FIG. 2. In this example, the squib firing unit 221 and/or the squib firing sequence analyzer 210 control firing signals associated with the commanding paths.

To provide redundant squib firing commands and, thus, facilitate autonomous deployment of the solar arrays 122, 132 by the squibs 224, the aforementioned commanding paths have numerous redundancies. For example, the commanding paths each include a local primary path, a local redundant path, a remote primary path and a remote redundant path. In this particular example, the local primary and redundant paths are associated with a primary initiator while the remote primary and redundant paths are associated with a redundant initiator. As a result, four commands are issued for every release device (e.g., each of the squibs 224). However, any appropriate number commands may be issued instead (e.g., based on redundancy and/or reliability requirements).

At block 422, the designated outputs of the squib firing unit 221 are armed. For example, the designated outputs are armed via all commanding paths associated with the squib firing unit 221.

At block 428, a fire command is sent by the squib controller 220 to the squib firing unit 221 via the local primary path.

At block 432, a fire command is sent by the squib controller 220 to the squib firing unit 221 via the local redundant path.

At block 436, a fire command is sent by the squib controller 220 to the squib firing unit 221 via the remote primary path.

At block 440, a fire command is sent by the squib controller 220 to the squib firing unit 221 via the remote redundant path and control of the process returns to block 404.

Figure 5:
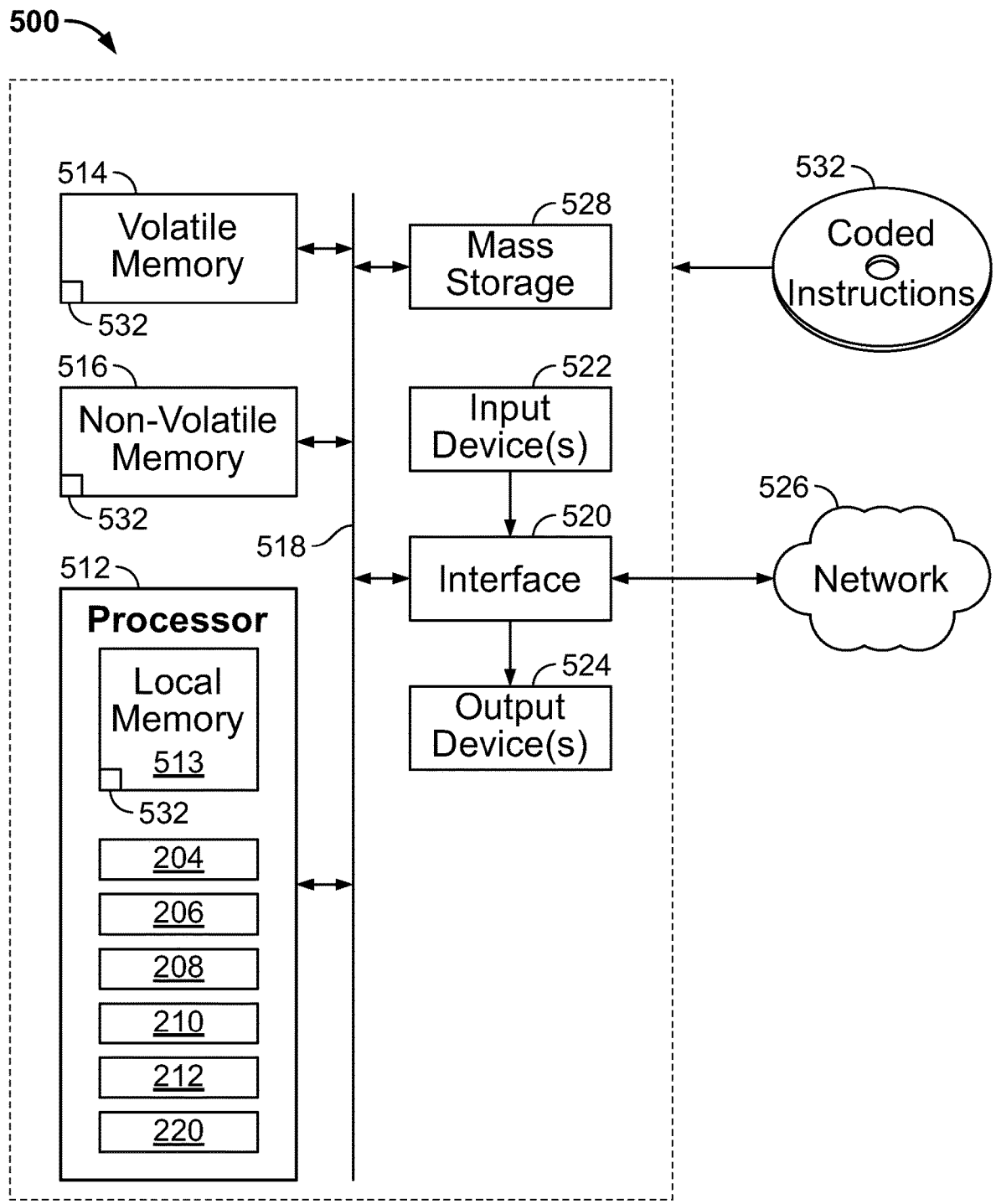
FIG. 5 is a block diagram of an example processing platform structured to implement the machine readable instructions of FIGS. 3, 4 and/or the example solar array deployment controller of FIG. 2.

FIG. 5 is a block diagram of an example processor platform 500 structured to execute the instructions of FIGS. 3 and 4 to implement the solar array deployment controller 200 of FIG. 2. The processor platform 500 can be, for example, a server, a personal computer, a guidance computer, a workstation, a self-learning machine (e.g., a neural network), or any other type of computing device.

The processor platform 500 of the illustrated example includes a processor 512. The processor 512 of the illustrated example is hardware. For example, the processor 512 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example sensor interface 204, the example solar array analyzer 206, the example orientation calculator 208, the example squib firing sequence analyzer 210, the example satellite maneuver controller 212, and the example squib controller 220.

The processor 512 of the illustrated example includes a local memory 513 (e.g., a cache). The processor 512 of the illustrated example is in communication with a main memory including a volatile memory 514 and a non-volatile memory 516 via a bus 518. The volatile memory 514 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 516 may be implemented by flash memory and/or any other desired type of memory device. Access to the main memory 514, 516 is controlled by a memory controller.

The processor platform 500 of the illustrated example also includes an interface circuit 520. The interface circuit 520 may be implemented by any type of interface standard, such as an Ethernet interface, a universal serial bus (USB), a Bluetooth® interface, a near field communication (NFC) interface, and/or a PCI express interface.

In the illustrated example, one or more input devices 522 are connected to the interface circuit 520. The input device(s) 522 permit(s) a user to enter data and/or commands into the processor 512. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 524 are also connected to the interface circuit 520 of the illustrated example. The output devices 524 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 520 of the illustrated example, thus, typically includes a graphics driver card, a graphics driver chip and/or a graphics driver processor.

The interface circuit 520 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 526. The communication can be via, for example, an Ethernet connection, a digital subscriber line (DSL) connection, a telephone line connection, a coaxial cable system, a satellite system, a line-of-site wireless system, a cellular telephone system, etc.

The processor platform 500 of the illustrated example also includes one or more mass storage devices 528 for storing software and/or data. Examples of such mass storage devices 528 include floppy disk drives, hard drive disks, compact disk drives, Blu-ray disk drives, redundant array of independent disks (RAID) systems, and digital versatile disk (DVD) drives.

The machine executable instructions 532 of FIGS. 3 and 4 may be stored in the mass storage device 528, in the volatile memory 514, in the non-volatile memory 516, and/or on a removable non-transitory computer readable storage medium such as a CD or DVD.

Example 1 includes a satellite having a solar array, a sensor to detect that the satellite has exited a launch vehicle, a processor to enable ignition of squibs of a squib array based on the satellite exiting the launch vehicle, and a squib controller to control the ignition of the squibs based on a firing sequence of the squibs, the squib controller to vary the firing sequence to autonomously deploy the solar array.

Example 2 includes the satellite of Example 1, where the squib controller is to vary the firing sequence based on at least one of ignited squibs, squib failures and a next squib to be ignited in the firing sequence.

Example 3 includes the satellite of Example 1, where the first sensor is a first sensor, and further including a second sensor to detect a folding condition of the solar array, where the squib controller is to vary the firing sequence based on the folding condition.

Example 4 includes the satellite of Example 1, where the sensor is a first sensor, and further including a second sensor to detect relative positions of landmarks external to the satellite.

Example 5 includes the satellite of Example 4, where the processor is to determine an orientation of the satellite based on the relative positions of the landmarks, and where the squib controller is to vary the firing sequence based on the orientation of the satellite during execution of the firing sequence.

Example 6 includes the satellite of Example 4, where the second sensor is enabled after the first sensor indicates that the satellite has exited the launch vehicle.

Example 7 includes the satellite of Example 4, where the landmarks include a star pattern Example 8 includes a method of autonomously deploying a solar array of a satellite. The method includes determining, via a sensor, that the satellite has exited a launch vehicle; upon determining that the satellite has exited the launch vehicle, igniting squibs of a squib array based on a firing sequence of the squibs, and varying, via instructions executed by a processor, the firing sequence of the squibs during execution of the firing sequence.

Example 9 includes the method of Example 8, where the firing sequence is varied based on ignited squibs, squib failures and a next squib to be ignited in the firing sequence.

Example 10 includes the method of Example 8, where the sensor is a first sensor, and further including detecting, via a second sensor, an orientation or dynamic state of the satellite during execution of the firing sequence, and where the firing sequence is varied based on the orientation or the dynamic state of the satellite during execution of the firing sequence.

Example 11 includes the method of Example 8, where the sensor is a first sensor, and further including detecting, via a second sensor, a folding condition of the solar array.

Example 12 includes the method of Example 11, where the firing sequence is varied based on the folding condition of the solar array.

Example 13 includes the method of Example 8, where varying the firing sequence includes at least one of re-ordering an ignition sequence of the squibs or removing at least one squib from the firing sequence.

Example 14 includes the method of Example 8, and further includes adjusting an orientation of the satellite based on star tracking information prior to igniting the squibs.

Example 15 includes a tangible machine readable medium comprising instructions, which when executed, cause a processor of a satellite to at least determine that the satellite has exited a launch vehicle based on sensor data, and upon determination that the satellite has exited the launch vehicle, vary a firing sequence of squibs of a squib array during execution of the firing sequence to autonomously deploy a solar array of the satellite.

Example 16 includes the tangible machine readable medium of Example 15, where the firing sequence is varied based on at least one of ignited squibs, squib failures and a next squib to be ignited in the firing sequence.

Example 17 includes the tangible machine readable medium of Example 15, where the firing sequence is varied based on determining an orientation of the satellite during execution of the firing sequence.

Example 18 includes the tangible machine readable medium of Example 15, where the firing sequence is varied based on a folding condition of the solar array, and where the folding condition determined based on image data taken by a sensor of the satellite.

Example 19 includes the tangible machine readable medium of Example 15, where the instructions cause the processor to adjust an orientation of the satellite based on star tracking information.

Example 20 includes the tangible machine readable medium of Example 19, where the instructions cause the processor to vary the firing sequence by at least one of re-ordering the firing sequence or eliminating at least one squib from the firing sequence.

From the foregoing, it will be appreciated that example methods, apparatus and articles of manufacture have been disclosed that enable autonomous deployment of solar arrays. Accordingly, ground intervention (e.g., remotely controlled deployment via ground control personnel), which can be time-consuming to establish, is not necessitated, thereby enabling relative quick solar array deployment. Further, examples disclosed herein enable robust autonomous deployment system that can correct for encountered errors, thereby increasing a reliability of solar array deployments. In other words, examples disclosed herein are relatively fault-tolerant. Some examples disclosed herein enable removal of components (e.g., sun sensors, micro-switch sensors, etc.) typically required for ground intervention, thereby saving weight and occupied space of spacecraft.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent. While examples disclosed herein are shown in the context of a satellite, spacecraft and/or space vehicle, examples disclosed herein can be apply to any appropriate application involving deployment of a structure extending or folding away from a respective body, including non-space-based applications.

What is claimed is:

1. A satellite comprising:
   a solar array;
   a sensor to detect that the satellite has exited a launch vehicle;
   a processor to, based on the satellite exiting the launch vehicle, cause release of magnets or locks of an array;
   a release controller to control the release of the magnets or the locks of the array based on a release sequence to autonomously deploy the solar array; and
   a sequence analyzer to adapt the release sequence during execution of the release sequence, wherein adapting the release sequence includes changing an order in which the magnets or the locks of the array are released based on a degree to which the solar array is unfolded.

2. The satellite as defined in claim 1, wherein the sensor is a first sensor, and further including a second sensor to detect a folding condition of the solar array, the sequence analyzer to adapt the release sequence based on the folding condition.

3. The satellite as defined in claim 1, wherein the sensor is a first sensor, and further including a second sensor to detect relative positions of landmarks external to the satellite to determine an orientation of the satellite.

4. The satellite as defined in claim 1, wherein the sequence analyzer is to change the order in which the magnets or the locks of the array in the release sequence are released by changing a first magnet from releasing after a second magnet to releasing the first magnet before the second magnet.

5. The satellite as defined in claim 4, wherein the sequence analyzer is to change the order in which ones of the magnets in the release sequence are released by further removing a third magnet from the release sequence.

6. The satellite as defined in claim 1, further including a satellite maneuver controller to move the solar array to an orientation in which momentum accumulation is reduced.

7. The satellite of claim 6, wherein the satellite maneuver controller is to control a first attitude and a first spin about a first axis that defines a position of the satellite to maintain a thermal condition.

8. A method of autonomously deploying a solar array of a satellite, the method comprising:
   determining, via a sensor, that the satellite has exited a launch vehicle;
   upon determining that the satellite has exited the launch vehicle, releasing magnets or locks of an array based on a release sequence to autonomously deploy the solar array; and
   adapting, via instructions executed by a processor, the release sequence of the magnets or locks of the array during execution of the release sequence, wherein the adapting of the release sequence includes changing an order in which the magnets or the locks of the array are released based on a degree to which the solar array is unfolded.

9. The method as defined in claim 8, wherein the sensor is a first sensor, and further including detecting, via a second sensor, a folding condition of the solar array and adapting the release sequence based on the folding condition.

10. The method as defined in claim 8, wherein the sensor is a first sensor, and further including detecting, via a second sensor, relative positions of landmarks external to the satellite to determine an orientation of the satellite.

11. The method as defined in claim 8, wherein adapting the release sequence includes changing a first magnet from releasing after a second magnet to releasing the first magnet before the second magnet.

12. The method as defined in claim 11, wherein adapting the release sequence includes removing a third magnet from the release sequence.

13. The method as defined in claim 8, further including moving the solar array to an orientation in which momentum accumulation is reduced.

14. The method as defined in claim 8, further including controlling a first attitude and a first spin about a first axis which defines a position of the satellite to maintains a thermal condition.

15. A non-transitory machine readable medium comprising instructions, which when executed, cause a processor of a satellite to at least:
   determine that the satellite has exited a launch vehicle based on sensor data;
   upon determination that the satellite has exited the launch vehicle, cause release of magnets or locks of an array based on a release sequence; and
   adapt the release sequence of the magnets or the locks of the array during execution of the release sequence to autonomously deploy a solar array of the satellite, wherein the release sequence is adapted by changing an order in which the magnets or the locks of the array are released based on a degree to which the solar array is unfolded.

16. The non-transitory machine readable medium as defined in claim 15, wherein the instructions cause the processor to determine a folding condition of the solar array and adapting the release sequence based on the folding condition.

17. The non-transitory machine readable medium as defined in claim 15, wherein the instructions cause the processor to determine relative positions of landmarks external to the satellite to determine an orientation of the satellite.

18. The non-transitory machine readable medium as defined in claim 15, wherein the instructions cause the processor to adapt the release sequence by changing a first magnet from releasing after a second magnet to releasing the first magnet before the second magnet.

19. The non-transitory machine readable medium as defined in claim 15, wherein the instructions cause the processor to cause an adjustment of an orientation of the satellite to an orientation in which momentum accumulation is reduced.

20. The non-transitory machine readable medium as defined in claim 19, wherein the instructions cause the processor to control a first attitude and a first spin about a first axis which defines a position of the satellite to maintain a thermal condition.

21. A non-transitory machine readable medium comprising instructions, which when executed, cause a processor of a satellite to at least:
- determine that the satellite has exited a launch vehicle based on sensor data;
- upon determination that the satellite has exited the launch vehicle, cause utilization of squibs, magnets or locks of an array based on a sequence;
- cause an adjustment of an orientation of the satellite to an orientation in which momentum accumulation is reduced; and
- adapt the sequence of the squibs, the magnets or the locks of the array during execution thereof to autonomously deploy a solar array of the satellite, wherein the sequence is adapted by changing an order in which the squibs, the magnets or the locks of the array are utilized based on a degree to which the solar array is unfolded.

22. The non-transitory machine readable medium as defined in claim 21, wherein the instructions cause the processor to control a first attitude and a first spin about a first axis which defines a position of the satellite to maintain a thermal condition.

\* \* \* \* \*